ively crystallization on optically active seeds. The needle-shaped crystals are readily converted to the cubic form by heating to a temperature above 30°C in the presence of water.

United States Patent [19]
Miyazawa et al.

[11] 3,880,918
[45] Apr. 29, 1975

[54] METHOD OF PURIFYING 3,4-DIHYDROXYPHENYLALANINE

[75] Inventors: Masashi Miyazawa; Ichiro Sasaji, both of Kawasaki; Tomoyoshi Hachiya, Kunitachi; Koji Toi, Yokohama; Teruo Uzuki, Kawasaki; Naotake Sato, Tokyo, all of Japan

[73] Assignee: Ajinomoto Co., Inc., Tokyo, Japan

[22] Filed: Mar. 12, 1971

[21] Appl. No.: 123,890

[30] Foreign Application Priority Data
Mar. 17, 1970 Japan................................. 45-22418
Mar. 17, 1970 Japan................................. 45-22419
Apr. 18, 1970 Japan................................. 45-32686

[52] U.S. Cl................................. 260/519; 260/519
[51] Int. Cl............................................ C07c 101/08
[58] Field of Search..................................... 260/519

[56] References Cited
UNITED STATES PATENTS
3,592,843    7/1971    Brossi et al.......................... 260/519

OTHER PUBLICATIONS
Vogel, A.I., Practical Organic Chemistry, 3rd Edition, (1962), pub. by John Wiley & Sons, Inc., New York, N.Y., (QD251v6 C.3), pages 129 & 130 relied on.

Primary Examiner—Lorraine A. Weinberger
Assistant Examiner—L. A. Thaxton
Attorney, Agent, or Firm—Hans Berman

[57] ABSTRACT

When DOPA (3,4-dihydroxyphenylalanine) is crystallized from its supersaturated aqueous solutions at a temperature below 30°C, colorless, neddle-shaped crystals are obtained in the presence of impurities which would produce gray, yellowish, or even darker cubic crystals at temperatures higher than 30°C. The purification effect is obtained whether the DOPA is in the DL-form, or in the optically active forms, and also in the optical resolution of the DL-form by preferential crystallization on optically active seeds. The needle-shaped crystals are readily converted to the cubic form by heating to a temperature above 30°C in the presence of water.

11 Claims, No Drawings

METHOD OF PURIFYING 3,4-DIHYDROXYPHENYLALANINE

This invention relates to the purification of 3,4-dihydroxyphenylalanine, hereinafter referred to as DOPA.

L-DOPA is a known therapeutic agent for treatment of Parkinson's disease. It is produced by fermentation or by optical resolution of synthetic DL-DOPA. Because of its two hydroxyl groups in ortho position, the compound readily oxidizes, particularly in the presence of moisture, and forms colored oxidation products. The therapeutically used material must be free of coloring matter and other impurities.

L-DOPA forms stable cubic crystals. When crude L-DOPA is recrystallized from its supersaturated aqueous solutions in the usual manner, the crystals are gray, if the supersaturation was brought about by partial evaporation of a more dilute solution or by neutralization of an acidic solution. In the latter case, the conventionally recrystallized material is additionally contaminated with anions of the acid employed in preparing the solution. Active carbon and oxygen acceptors cannot entirely prevent the crystals from being slightly colored.

It has now been found that DOPA forms much purer needle-shaped crystals from supersaturated solutions from which only colored and otherwise contaminated cubic crystals can be precipitated by conventional methods. Perfectly colorless and pure needle-shaped crystals can usually be formed from dark and practically opaque mother liquors from which only deeply colored cubic crystals would be formed. This is contrary to the common experience that needle-shaped crystals, because of their more unfavorable weight-to-surface ratio, are more heavily contaminated than cubic crystals precipitated from the same solution.

It has been found that the crystals of DOPA, that is, DL-DOPA, L-DOPA, or D-DOPA, formed from the supersaturated respective aqueous solutions below 30°C are needle-shaped and purer than the crystals formed from the same solutions above 30°C which are cubic. Holding the needle-shaped crystals in contact with water above 30°C causes their conversion to the cubic form. Residual impurities may be expelled during this conversion.

The precipitation of the needle-shaped crystals may be brought about by making an aqueous DOPA solution supersaturated at any temperature below 30°C at which the solution is liquid. For practical reasons, precipitation should normally take place between 0° and 25°C.

A DOPA solution may be supersaturated in any conventional manner as by cooling a more dilute solution below its saturation temperature, by partly evaporating the water in the solution, by adding a water soluble solvent in which DOPA is insoluble or not readily soluble, and in any other known manner. Because DOPA is much more soluble at acidic pHs, it is most convenient to dissolve the starting material in dilute acid, and then partly to neutralize the solution so obtained. In the absence of any advantages to be gained from the use of more costly acids, equally effective, it is preferred to dissolve DOPA in dilute hydrochloric or sulfuric acid. Any alkaline material, such as the alkali metal hydroxides, ammonia, and salts of strong bases with weak acids, such as sodium carbonate, ammonium carbonate, or the corresponding acetates may be employed. Sodium acetate is preferred because little heat of neutralization is developed. The DOPA solution may be prepared in water as the sole solvent, but water soluble organic solvents, such as lower alkanols, dioxane, or acetone may be present.

The numerical concentration of DOPA in the supersaturated solution is not critical. It is convenient to operate at concentrations between 10 g and 20 g per deciliter, but lower and higher concentrations are equally operative, and the changes in concentration will produce only the predictable minor effects on the crystallization rate, product purity, and other operating variables.

Seed crystals may be employed to initiate crystallization in a known manner, and needle-shaped seed crystals of one of the optically active forms induce crystallization of pure needle-shaped crystals of the same enantiomorph from a contaminated solution of the DL-form, if the crystallization takes place at a temperature below 30°C.

If the supersaturated solution initially contains much more of one optically active form than of the other, crystallization of the predominant optically active form starts spontaneously, and the optically pure or at least purified crystals may be separated from the remainder of the solution before a significant amount of the other enantiomorph crystallizes.

The rate of resolution and the amount of optically active material extracted from a solution of the DL-form usually increases with the amount of seed crystals used if the latter amount is varied between 1% and 10% of the weight of racemic DOPA in the solution, but the amount of seed crystals is not critical. The rate of resolution also increases with the DOPA concentration, and it is preferred to have a small amount of acid, such as hydrochloric or sulfuric acid, present in the initial solution of the racemate in order to improve solubility. The acid also has a stabilizing effect on the non-seeded enantiomorph which has a lesser tendency to crystallize spontaneously in the presence of the acid.

Purified DL-DOPA in the form of needle-shaped crystals may be resolved into the optically active enantiomorphs in any desired and known manner, as by preferential precipitation of one enantiomorph on seed crystals. DL-DOPA is more soluble in water than the optically active forms, and may therefore be removed when present as an impurity in the optically active material by the use of an amount of water or other aqueous solvent too small to dissolve the bulk of the product. Conversely, pure, optically active DOPA may be crystallized free from an accompanying minor amount of the DL-form or of the other enantiomorph.

The precipitated, needle-shaped DOPA crystals of the invention are readily filtered or otherwise separated from the remainder of the solution in a conventional manner, and adhering mother liquor is effectively removed with small amounts of washing water or other suitable liquid.

When the needle-shaped crystals are heated in the presence of water to a temperature above 30°C, they are rapidly converted to the cubic form. The conversion is complete at 45° to 50°C practically independently of the heating rate at which this temperature is reached. If the conversion is carried out in the presence of a relatively great amount of water, as by dispersing the needle-shaped crystals at least in an equal weight of water, the cubic crystals obtained may be significantly purer than the starting material. The amount of water needed for the conversion, however, is very small, a film of moisture retained on the needle shaped crystals after filtering and washing on the filter being entirely adequate. Three to five weights of water are preferably mixed with the needle-shaped crystals prior to heating to the conversion temperature for best removal of residual impurities.

Oxygen receptors, such as conventional reducing agents, are useful in the method of the invention to prevent oxidation by oxygen present in ambient liquid or air. A very wide range of reducing agents is effective. They include, but are by no means limited to aqueous sulfur dioxide, sodium bisulfite, sodium sulfite, sodium hydrogen phosphite, sodium phosphite, sodium arsenite, sodium hyposulfite, the corresponding potassium or ammonium salts, and organic reducing agents such as hydroquinone or formaldehyde.

The following Examples further illustrate this invention.

EXAMPLE 1

10 g Reddish-brown, crude, solid L-DOPA were suspended in 100 ml water, and 60 ml concentrated hydrochloric acid were added to almost entirely dissolve the solids. The solution was further mixed with 10 mg crystalline sodium bisulfite as an oxidation inhibitor, and a small amount of insoluble material was removed by filtration.

The filtrate was cooled to 15°C, and a cold, 40% sodium acetate solution was added with stirring drop by drop at a rate so as not substantially to raise the temperature. The pH reached 3.0 – 3.5 after 10 minutes, and stirring at 15°C and without further additions was continued for 1 hour, whereby needle-shaped, colorless crystals were precipitated. They were filtered out and suspended in 40 ml water containing 10 mg sodium bisulfite.

The slurry so obtained was gradually heated to 60°C with stirring over a period of 9 minutes and then cooled to ambient temperature, whereby a second crop of pure L-DOPA crystals was precipitated. When filtered off, washed with a little water, and dried, the crystals weighted 9.2 g. They were colorless and cubic and contained less than 0.01% chlorine.

For comparison purposes, a solution of crude L-DOPA in aqueous hydrochloric acid was prepared as described above. Prior to filtering, it was stirred with 1.0 g active carbon at 25° – 30°C for one hour. The filtrate was still faintly yellow. It was heated to 60° – 70°C, and the pH was adjusted to 3.0 – 3.5 with stirring within 1 hour by adding the sodium acetate solution. The cubic crystals thereby precipitated were filtered off, washed with a little water, and dried. They weighed 8.9 g and were gray. Their chlorine content was 0.09% – 0.10%.

When these crystals were again subjected to the same purification treatment, the yield was 8.1 g, but the color and chlorine content were unchanged.

EXAMPLE 2

40.0 g Dark green, crude, synthetic DL-DOPA were dissolved in 400 ml water and 240 ml concentrated hydrochloric acid. A small amount of insoluble material was removed by filtration, and the filtrate was mixed with 20 mg sodium bisulfite and cooled to 10°C. Crystallization was induced by dropwise addition of 40% sodium acetate solution with stirring until the pH reached 3.0 – 3.5. The mixture was then permitted to stand for 1 hour at 10°C.

A precipitate of colorless needles of pure DL-DOPA was recovered by filtering, and slurried in 240 ml water containing 20 mg sodium bisulfite. The slurry was stirred while it was being heated to 60°C in 16 minutes and thereafter cooled to room temperature.

The cubic crystals of DL-DOPA thereby precipitated were filtered, washed with a little water, and dried. They were colorless and weighed 34.4 g.

When an analogous solution of the crude DL-DOPA in dilute hydrochloric acid was stirred with 4.0 g active carbon at 40° – 50°C for 1 hour prior to filtering, a faintly yellow filtrate was obtained. Cubic DL-DOPA was precipitated directly therefrom by adding sodium acetate solution to pH 3.0 – 3.5 with stirring over 1 hour at 60° – 70°C and thereafter cooling. The recovered crystals weighed 35.2 g and were still faintly yellow. No change in color could be achieved by repeating the entire purification procedure, but the yield was reduced to 31.7 g.

EXAMPLE 3

10.0 g Dark gray, crude L-DOPA were dispersed in 100 ml of a mixture of nine volumes of water and one volume of methanol, and 12.0 ml 12 N sulfuric acid were added, followed by 10 mg sodium bisulfite. Insoluble material was removed by filtering, and the filtrate was cooled to 20°C and adjusted to pH 3.0 – 3.5 with a 20% sodium carbonate solution added dropwise with stirring. Stirring was continued thereafter at 20°C for 1 hour, and the needle-shaped crystals formed were recovered by filtering.

They were dispersed in 50 ml water, 10 mg sodium bisulfite was added, and the mixture was allowed to stand overnight at 35°C. The cubic L-DOPA crystals formed were filtered off, washed with water and then with acetone, and dried. They weighed 9.1 g, were colorless, and contained less than 0.01% sulfate ion.

When methanol in the above procedure was replaced by an equal volume of acetone, the same pure L-DOPA was obtained in a yield of 8.8 g.

8.7 g Equally pure L-DOPA were obtained when the crude L-DOPA was dissolved in a 9:1 mixture of water and dioxane, and 2 N aqueous ammonium hydroxide was used as a neutralizing agent instead of the sodium carbonate solution.

EXAMPLE 4

10.0 g Dark green, crude, synthetic DL-DOPA and 5.0 mg sodium bisulfite were dispersed in 1000 ml water. Insoluble material was removed by filtering, and the filtrate was evaporated in a vacuum at 25°C until its volume was reduced to about 500 ml. Needle-shaped DL-DOPA crystals precipitated and were recovered by filtering. They were colorless and weighed 5.2 g.

EXAMPLE 5

10.0 g Reddish-brown, crude L-DOPA were dissolved in 100 ml water and 60 ml concentrated hydrochloric acid. The solution was filtered, and the filtrate was cooled to 15°C and adjusted to pH 3.0 – 3.5 by adding 40% sodium acetate solution drop by drop with stirring. Agitation was continued after the pH adjustment for 1 hour at 15°C. Needle-shaped, colorless crystals were precipitated from the dark brown mother liquor, filtered off, washed with a little water, and dried.

They were suspended in 40 ml water, and the suspension was heated to 55°C with stirring within 10 minutes, permitted to cool to room temperature, and filtered. The recovered, cubic L-DOPA crystals were washed with a little cold water and dried. They were colorless, contained less than 0.01% chlorine, and weighed 8.8 g.

EXAMPLE 6

7.5 g Needle-shaped crystals of DL-DOPA were suspended in 500 ml water at 20°C, and 500 mg sodium bisulfite were added with stirring. The mixture was filtered, and the filtrate was cooled to 18°C with stirring and thereafter seeded with 0.38 g needle-shaped L-DOPA crystals. The temperature of the mixture was reduced gradually until it reached 12°C after 30 minutes. The precipitate was recovered by filtering and dried in a desiccator over phosphorus pentoxide. The dry L-DOPA crystals weighed 0.9 g and had a specific rotation $[\alpha]_D^{20} = -11.3°$ (C=6, in 1N HCl), corresponding to an optical purity of 91%.

Upon standing overnight at 3°C, the mother liquor spontaneously yielded a crop of needle-shaped D-DOPA crystals weighing 0.54 g and having a specific rotation $[\alpha]_D^{20} + 10.2°$ (C=6, in 1N HCl) corresponding to an optical purity of 83.6%.

EXAMPLE 7

13 g Needle-shaped crystals of DL-DOPA were suspended in 300 ml 0.1-N hydrochloric acid at 20°C with stirring, and the suspension was filtered. The filtrate was cooled to 18°C, seeded with 0.6 g needle-shaped L-DOPA crystals, and permitted to stand overnight at 5°C. The needle-shaped L-DOPA crystals formed were filtered out and dried. They weighed 1.8 g and had an optical purity of 82.8% ($[\alpha]_D^{20} = -10.1°$, C=6, in 1N HCl).

EXAMPLE 8

500 Milliliters of a dark gray mother liquor obtained by filtering after crystallization of DL-DOPA after the synthesis of the latter still contained 6.9 g DL-DOPA and accumulated impurities. It was mixed with 5 ml of a 6% sulfur dioxide solution, cooled to 20°C with stirring, and seeded with 0.38 g needle-shaped L-DOPA crystals. The temperature was further reduced to 12°C with stirring during 40 minutes, and the mixture was then filtered. The recovered L-DOPA crystals were dried over phosphorus pentoxide and weighed 0.88 g. They were colorless and had an optical purity of 89.4% ($[\alpha]_D^{20} = -10.9°$, C=6, in 1N HCl).

EXAMPLE 9

20 g Brown, cubic crystals of DL-DOPA were suspended in 300 ml water and dissolved by adding 10 ml concentrated hydrochloric acid with stirring. While the temperature was held at 25°C, 3 ml 6% sulfur dioxide solution and thereafter 20 ml 1N sodium acetate solution were added with stirring. The solution was then seeded with 0.5 g needle-shaped L-DOPA crystals, and 20 ml 1N sodium acetate solution were added dropwise over a period of 40 minutes.

The crystalline precipitate formed was recovered by filtering and dried over phosphorus pentoxide. The dry, needle-shaped crystals were colorless, weighed 2.3 g, and had an optical purity of 84.5% ($[\alpha]_D^{20} = -10.3°$, C=6, in 1N HCl).

EXAMPLE 10

20.0 g Reddish brown crystals of L-DOPA containing a small amount of DL-DOPA (optical purity 90.8%) were suspended in 200 ml water. 13.5 ml Concentrated hydrochloric acid, 1 ml 6% sulfur dioxide solution, and 1 g active carbon were added with stirring in this order, and stirring was continued at room temperature for 30 minutes. The mixture was filtered, the filtrate was cooled to 15°C, rapidly mixed with enough 40% sodium acetate solution to raise the pH to 3.0 - 3.5, and then permitted to stand for 1 hour at 15°C.

The needle-shaped crystals so formed were filtered off and suspended in 140 ml water. The suspension was heated to 55°C in 2 minutes with stirring and then cooled to room temperature over a period of 2 hours. The precipitated cubic crystals were filtered off, washed with water, and dried. They were colorless, weighed 16.1 g, contained less than 0.01% Chlorine, and had an optical purity of 99.1% ($[\alpha]_D^{20} = -10.9°$, C=2, in 1N HCl).

When an analogous solution of the starting material was purified with carbon as described above and filtered, and the filtrate was directly adjusted to pH 3.0 - 3.5 with 40% sodium acetate solution at 50° - 60°C and cooled to room temperature with stirring, the cubical crystals obtained were yellowish, weighed 17.2 g, contained 0.1 - 0.2% chlorine, and had an optical purity of 97.5%.

EXAMPLE 11

A 20% solution of crude L-DOPA in dilute hydrochloric acid was adjusted to pH 3.2 with sodium acetate solution at 20°C, and the needle-shaped, precipitated crystals were filtered off. A portion of the wet crystals weighing 50 g and containing 37.4 g L-DOPA of 87.5% optical purity was suspended in 430 ml cold water. 500 mg Sodium bisulfite were added, and the mixture was stirred at 15°C for 8 hours. The precipitate of needle-shaped crystals so obtained was filtered off, dried first at room temperature, and then at 60°C. The dried L-DOPA crystals weighed 31.2 g and had an optical purity of 97.4% ($[\alpha]_D^{20} = 11.7°$, C=2, in 1N HCl), indicating a 93.0% recovery of the L-DOPA present in the starting material.

EXAMPLE 12

Another 10.0 g portion of wet crystals prepared as in Example 11 from a crude L-DOPA solution contained 7.5 g L-DOPA of 84.2% optical purity. The crystals were dissolved in 1000 ml water at 20°C, and 500 mg sodium bisulfite were added 15.0 g Wet, needle-shaped crystals containing 9.8 g DL-DOPA were stirred with the solution for 8 hours at 20°C.

The mixture was filtered, and the recovered needle-shaped crystals were dried first at room temperature, and thereafter at 60°C for 3 hours. They weighed 6.3 g and had an optical purity of 95.0% ($[\alpha]_D^{20} = -11.4°$, C=2, in 1N HCl), indicating a recovery of 94.8% of the pure L-DOPA initially present.

While the invention has been described with particular reference to specific embodiments, it is to be understood that it is not limited thereto, but is to be construed broadly and restricted solely by the scope of the appended claims.

What is claimed is:

1. A method of purifying 3,4-dihydroxyphenylalanine of accompanying water-soluble impurities which comprises:
   a. preparing an aqueous solution of the 3,4-dihydroxyphenylalanine to be purified;
   b. making said solution supersaturated with respect to 3,4-dihydroxyphenylalanine;
   c. holding the supersaturated solution in the liquid state at a temperature below 30°C until needle-shaped crystals of purified 3,4-dihydroxyphenylalanine are precipitated; and
   d. separating the precipitated crystals from the remainder of said solution.

2. A method as set forth in claim 1, wherein said impurities include coloring matter in an amount sufficient to cause precipitation of colored cubic crystals of 3,4-dihydroxyphenylalanine if said supersaturated solution is held at a temperature above 30° C.

3. A method as set forth in claim 2, wherein said supersaturated solution is contacted with needle-shaped seed crystals of said 3,4-dihydroxyphenylalanine in order to induce precipitation of said 3,4-purified dihydroxyphenylalanine from said solution.

4. A method as set forth in claim 3, wherein said 3,4-dihydroxyphenylalanine to be purified consists essentially of the DL-form, and said seed crystals are of one of the optically active forms of said 3,4-dihydroxyphenylalanine, said supersaturated solution of the DL-form being held in contact with said seed crystals until said purified 3,4-dihydroxyphenylalanine precipitates from said supersaturated solution in said optically active form.

5. A method as set forth in claim 2, wherein the 3,4-dihydroxyphenylalanine to be purified consists essentially of one optically active form containing a small amount of the other optically active form as an impurity, said supersaturated solution being held at said temperature until purified crystals of said one optically active form are precipitated, and said crystals are separated from the remainder of said solution before a substantial amount of said other optically active form is precipitated in crystalline form.

6. A method as set forth in claim 2, wherein said separated needle-shaped crystals are held in contact with water at a temperature above 30°C until the crystals are converted to the cubic form.

7. A method as set forth in claim 2, wherein said 3,4-dihydroxyphenylalanine to be purified is in the DL-form.

8. A method as set forth in claim 1, wherein said 3,4-dihydroxyphenylalanine to be purified is in the DL-form.

9. A method as set forth in claim 2, wherein said supersaturated solution is acidic while being held at said temperature.

10. A method as set forth in claim 2, wherein said supersaturated solution is held at pH 3.0 – 3.5 while at said temperature.

11. A method as set forth in claim 2, wherein said supersaturated solution is held at said temperature from the beginning of said precipitating to said separating.

* * * * *